July 20, 1943.                B. D. BAKER ET AL                2,324,667
        DIVIDING AND WEIGHING OF BREAD DOUGH AND LIKE PLASTIC MASSES
                    Filed Oct. 2, 1941              2 Sheets-Sheet 1

INVENTORS,
Barton Dell Baker
Laurence Seymour Harber
John Edward Pointon
By George B. Willcox
ATTORNEY.

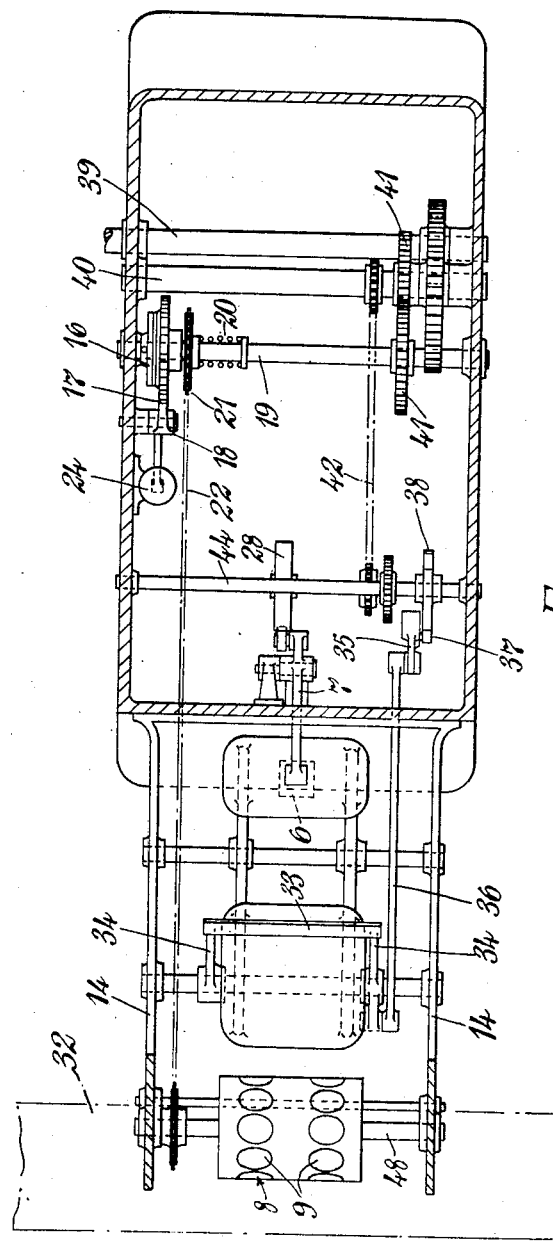

Patented July 20, 1943

2,324,667

UNITED STATES PATENT OFFICE 2,324,667

DIVIDING AND WEIGHING OF BREAD DOUGH AND LIKE PLASTIC MASSES

Barton Dell Baker, Laurence Seymour Harber, and John Edward Pointon, Peterborough, England Application October 2, 1941, Serial No. 413,290
In Great Britain May 7, 1940

5 Claims. (Cl. 249—5)

This invention relates to the division and weighing of bread dough or like plastic masses where accurate weighing is required.

Owing to the loss of weight in baking it is always necessary to produce a dough piece of greater weight than that required for the finished loaf but, in addition to this, as in practice it is impossible mechanically to divide dough pieces such that they run consistently of exactly the same weight, some being slightly under and some slightly over the exact weight required to produce the finished loaf, it has been customary for bakers to set and operate dividers so that whatever variations occur the divider does not produce under-weight dough pieces. This means that the baker regularly produces excess weight dough pieces in order to avoid (owing to the irregularities of operation of the divider) the fortuitous production of under-weight dough pieces. Naturally, any dough put by the baker into the finished loaf over and above that required to produce the correct weight of loaf is a loss to the baker, and the present invention is directed to remove this disadvantage and provide an improved means whereby the baker is enabled uniformly to produce dough pieces of more nearly the exact weight required for a predetermined loaf than hitherto.

The invention consists in dividing dough pieces each of a bulk calculated to weigh slightly under that required for the production of the predetermined loaf, placing the divided under-weight pieces upon a scale and making up the exact weight by the automatic addition of dough in an amount equal to the deficiency as determined by the balance of the scale.

The "make weight" dough may be added as a series of pellets or pats, each of predetermined size, the number of pieces together being approximately equal in weight to that required to make up the deficiency as determined by the balance of the scale.

One form of means according to the invention comprises a dough divider set to divide under-weight dough pieces and adapted to deliver such in turn to a scale pan of a weighing machine, and a pocketed wheel or drum operating in conjunction with a dough supply to deliver a series of dough pellets or pats formed in the pockets to the dough on the scale, the wheel or drum being started when the main dough piece is on the scale pan and stopped as soon as the scale begins to balance. It will thus be appreciated that the under-weight dough piece on the scale will receive the number of pellets or pats required to make up the total weight of dough substantially exactly to that required for the predetermined loaf.

It is preferred simultaneously with the actuation of unlocking means for the scale, to initiate an electric circuit which sets the pocketed wheel in rotation to deliver dough pats on to the dough piece on the scale pan, and to interrupt the circuit immediately the scale starts to move toward the balancing position thereby stopping the pocketed wheel and terminating abruptly the delivery of the make-weight pellets.

In the accompanying drawings:

Figure 2 is a corresponding plan, certain parts being omitted.

Figure 1:
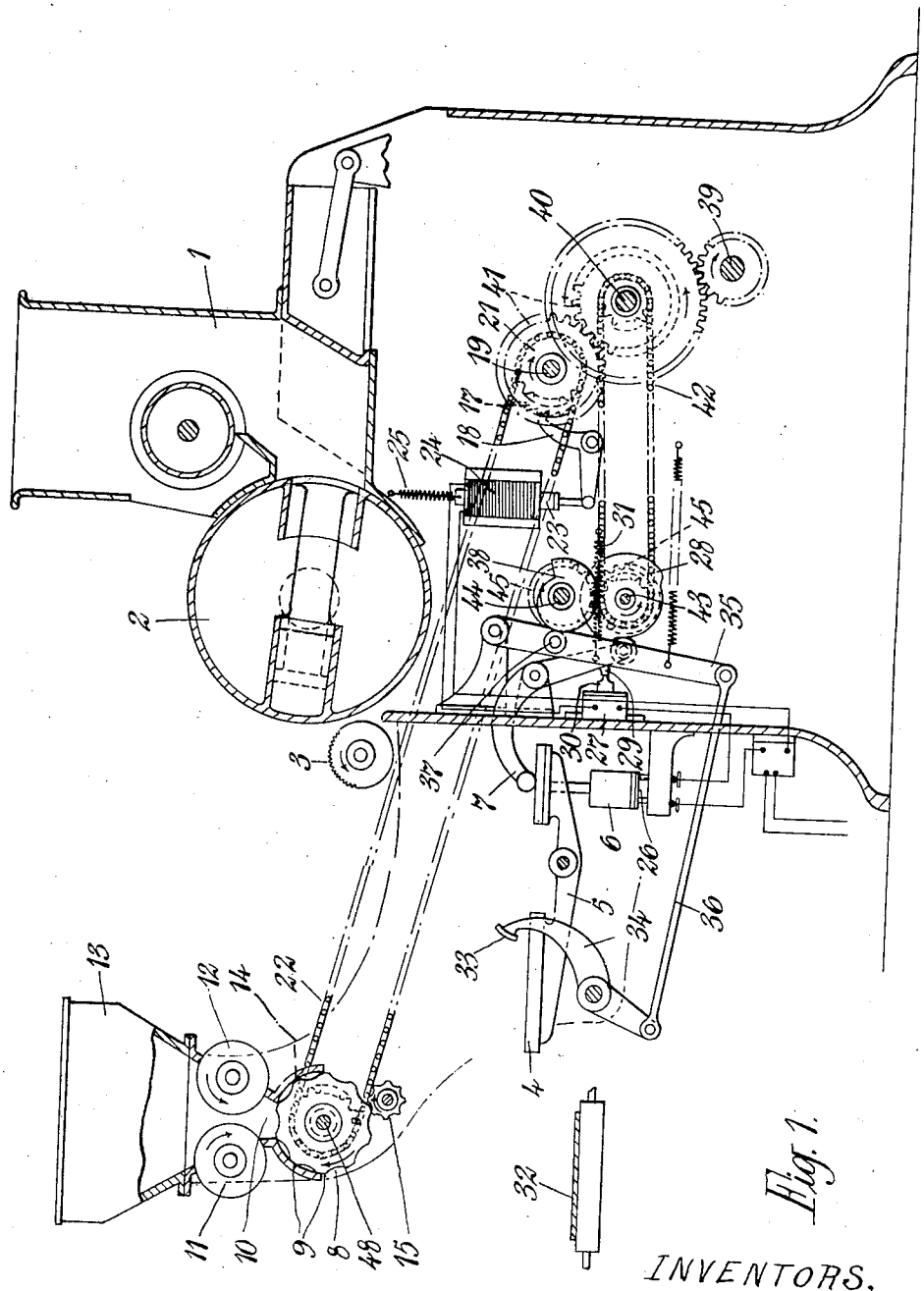
Figure 1 is a sectional elevation of an apparatus according to the invention.

In carrying the invention into effect according to one convenient mode as described by way of example as applied to the production of dough pieces for 2-lb. loaves by the pellet method, a divider 1 of any suitable known form and having a rotary dividing drum 2 is set to deliver dough pieces of about 2 lbs. 2½ ozs. in weight, it being understood that the aim is to produce a final dough piece weighing as nearly as possible 2 lbs. 3 ozs. in order to produce (allowing for baking losses) a 2-lb. finished loaf. The structure for controlling and operating the drum 2 may be that disclosed in United States Patent No. 1,763,322 issued June 10, 1930, to J. E. Pointon et al. The dough divider delivers the pieces in succession onto a fluted discharge roll 3 by which they are delivered over a suitably apron or guideway (not shown) onto the pan 4 of a weighing scale 5 for balancing in this case against a weight 6 of 2 lbs. 3 ozs. The scale is locked by the pivoted locking lever 7 when the dough piece is received so as to avoid upsetting the scale by the impact of the dough. The locking means are under control so that the scale is unlocked and relocked according to the sequence of operations as will be herein described.

Adjacent the scale a make-weight device is mounted consisting of a rotary drum 8 having a series of pockets or cavities 9 in its periphery and adapted to be rotated so that its pocketed surface passes through a chamber or dough supply 10 to allow the pockets or cavities to fill with dough as the cavities in sequence pass into the chamber. The supply of dough to the chamber 10 is maintained by feed rolls 11, 12 from the hopper 13. The edge of the wall 14 of the chamber 10 is adapted to cut off or strickle the dough in the pockets flush with the drum surface. The size of the pockets or cavities 9 is such that the pellets conveniently each weigh $\tfrac{1}{16}$ oz. although pellets of smaller weight may, if desired, be employed. Adjacent the surface of the drum 8 on the delivery side is a small fluted wheel 15 which revolves rapidly to extract the dough pieces from the pockets 9 during the rotation of the pocketed drum and project them on to the dough piece lying on the scale pan.

Various means may be provided for giving the pocketed drum 8 a partial rotation sufficient to cause the exact number of pellets to be delivered on to the main dough piece as is required to make up its weight to the 2 lbs. 3 ozs. referred to above. The number of pellets delivered is controlled by the scale. For example, the shaft of the pocketed drum 8 may be driven from a friction clutch 16 under the control of a ratchet wheel 17.

The ratchet wheel 17 is slidable upon and rotatable relative to a shaft 19 and forms one part of the clutch, the other part of which is secured to the shaft 19. The clutch discs are provided with suitable friction surfaces and are held in engagement by the spring 20. Normally the ratchet wheel 17 is prevented from rotating by the pawl 18. Secured to the ratchet wheel is a sprocket 21 by which the drum 8 is driven by the chain 22. The pawl 18 is connected to the core 23 of a solenoid 24 and is held in engagement with the ratchet by means of a spring 25. When the solenoid is energised the core moves downwardly to disengage the pawl from the ratchet teeth against the action of its spring. The solenoid is energised by an electric circuit controlled by the scale pan. For example, on the weight side of the knife edge of the scale an electric contact device or circuit breaking mechanism 26 in the circuit of the solenoid is normally closed but adapted to open to interrupt the circuit immediately the scale starts to move toward the balancing position. The electric circuit of the solenoid has another switch 27 which is controlled in synchronism with the locking and unlocking lever 7 of the weighing machine. Normally the circuit at the switch 27 is open but as soon as the scale is unlocked the circuit is closed, with the result that the solenoid is energised and moves the pawl 18 out of engagement with the ratchet wheel 17, permitting the ratchet wheel to be driven by the clutch 16 and the pocketed drum 8 to rotate, with the consequent result that while the rotation continues dough pellets are formed in the pockets 9 of the drum and picked out by the fluted wheel 15 and delivered to the dough piece on the scale pan 4. The delivery of dough pellets continues while the pawl 18 is held out of engagement with the ratchet wheel 17. As the dough pellets are added to the dough piece on the scale its weight will be progressively increased and finally the scale will move to the balancing position. Immediately this occurs the circuit breaker 26 opens and the circuit of the solenoid will be interrupted. The pawl under the action of its spring 25 will be thus engaged with the ratchet wheel 17 and the pocketed drum 8 will immediately cease to revolve and no further dough pellets will be delivered to the dough piece on the scale pan 4.

Assuming that the divider in fact delivered a dough piece weighing 2 lbs. 2½ ozs. the pocketed wheel would be stopped as soon as eight pellets had been discharged upon it. If the divider delivered a dough piece slightly less than 2 lbs. 2½ ozs. then the number of dough pieces would be proportionately greater than eight, while if the dough piece as divided weighed more than 2 lbs. 2½ ozs. a smaller number of pellets would be delivered.

The scale locking lever 7 is controlled by a rotary cam 28 which rocks the lever and raises the arm from the scale. At the same time the nose 29 on the lever engages the switch stud 30 to close the switch 27. The return movement of the lever 7 is effected by the returning spring 31 under cam control.

After the correcting of the weight of the dough piece it is adapted to be removed from the scale pan 4 and delivered to the conveyor 32. This may conveniently be effected by the pivoted flicker device or bar 33 carried by the levers 34, one of which is linked to the lever 35 by link 36. The lever carries a roller or pin 37 engaging a rotary cam 38 having an abrupt drop to produce a sharp flicking action of the bar 33. The cam 38 is synchronised with the cam 28 to operate the flicker immediately after the relocking of the scale.

The various parts of the apparatus are driven from a main shaft 39 which is geared to a countershaft 40. From the countershaft the shaft 19 is driven by gearing 41. Also, by a chain and sprocket drive 42, the countershaft 40 drives the shaft 43 carrying the scale locking cam 28. The shaft 43 drives a shaft 44 by gearing 45. The shaft 44 carries the flicker cam 38.

The rolls 11 and 12 of the pellet dough hopper, and the fluted roll 15, are driven by gears not shown, from the shaft 48 on which the pocketed drum 8 is mounted.

We claim:

1. Apparatus for the production of bread, comprising a dough divider set to divide under-weight dough pieces and adapted to deliver these successively to a scale pan, means for locking the scale during such delivery and for immediately thereafter releasing the same and a rotary pocketed drum adapted to deliver a series of dough pellets or pats to a dough piece on the scale; means for starting the operation of the pocketed drum on delivery of such a divided piece on the scale and means for halting rotation of the drum as soon as the scale balances.

2. Apparatus for the production of bread comprising a dough divider set to divide underweight dough pieces and adapted to deliver them successively to a scale pan, means for locking the scale during such delivery and for immediately thereafter releasing the same, comprising a pivoted lever controlled by a rotary cam; a starting switch and means associated with said lever for actuating the switch and thereby initiating an electric circuit simultaneously with release of the scale locking means; a rotary pocketed drum adapted to deliver a series of dough pellets on the scale pan; means controlled by said circuit for starting rotation of the pocketed drum on delivery of each underweight dough piece on the scale pan, and a make-and-break device arranged to interrupt the said circuit upon movement of the scale toward balance position, thereby halting the drum as soon as the scale moves toward balance position.

3. Apparatus as claimed in claim 2, wherein means are provided for discharging balanced dough pieces from the scale pan comprising a pivoted flicker actuated from a rotary cam having an abrupt drop and synchronized with the operation of said pivoted lever.

4. Apparatus for the production of bread comprising a dough divider set to divide under-weight dough pieces and adapted to deliver these successively to a scale pan, means for locking the scale during such delivery and for immediately thereafter releasing the same, and a rotary pocketed drum adapted to deliver a series of dough pellets or pats to a dough piece on the scale, means for starting the operation of the pocketed drum on delivery of such a divided piece on the scale, and means for halting rotation of the drum as soon as the scale balances; said starting and halting means comprising a rotatable drum-actuating shaft, clutch means associated with said shaft and provided with a releasable control device; a circuit including a solenoid adapted to actuate said control, a circuit-breaking means actuated by movement of the scale toward balancing position, and another normally open switch in said circuit and controlled in synchronism with the scale pan by the locking means to close said circuit.

5. Apparatus for the production of bread comprising a dough divider set to divide under-weight dough pieces and adapted to deliver these successively to a scale pan, means for locking the scale during such delivery and for immediately thereafter releasing the same, and a rotary pocketed drum adapted to deliver a series of dough pellets or pats to a dough piece on the scale, means for starting the operation of the pocketed drum on delivery of such a divided piece on the scale, and means for halting rotation of the drum as soon as the scale balances; said starting and halting means comprising a slip friction drive incorporating a ratchet wheel the pawl of which is engaged by a spring to prevent rotation, a circuit including a solenoid adapted to actuate said pawl, a switch in said circuit controlled by said locking means, the removal of the pawl being effected by energizing the solenoid when said switch is closed by movement of said locking means, and a second switch in said circuit responding to balancing of the scale pan to open the circuit.

BARTON DELL BAKER.
LAURENCE SEYMOUR HARBER.
JOHN EDWARD POINTON.